United States Patent [19]

Karickhoff

[11] Patent Number: 4,489,174
[45] Date of Patent: Dec. 18, 1984

[54] VESICULATED BEADS

[75] Inventor: Michael Karickhoff, Matteson, Ill.

[73] Assignee: The Sherwin-Williams Company, Cleveland, Ohio

[21] Appl. No.: 606,483

[22] Filed: May 3, 1984

Related U.S. Application Data

[62] Division of Ser. No. 517,491, Jul. 26, 1983, Pat. No. 4,461,849.

[51] Int. Cl.$^3$ .................................................. C08J 9/22
[52] U.S. Cl. ........................................ 521/54; 521/62; 521/64; 521/138; 521/139; 521/140; 523/337; 523/501; 524/801
[58] Field of Search ............... 523/337, 501; 524/801; 521/62, 64, 138, 54, 139, 140

[56] References Cited

U.S. PATENT DOCUMENTS 3,255,127 6/1966 Von Borin ............................ 521/64
3,822,224 7/1974 Gillan et al. ..................... 260/2.5 N
3,879,314 4/1975 Gunning ........................... 260/2.5 N

FOREIGN PATENT DOCUMENTS 1476510 6/1977 United Kingdom .

Primary Examiner—Morton Foelak
Attorney, Agent, or Firm—Robert E. McDonald; James V. Tura

[57] ABSTRACT

Vesiculated beads having improved scattering efficiency and resistance to shrinkage are prepared by a process which comprises:
  (a) forming in the presence of a polyamine, as a water-in-oil emulsion, a stable dispersion of droplets of water in a solution of a carboxylic acid functional unsaturated polyester resin having an acid value of 8 to 20, and at least one ethylenically unsaturated monomer copolymerizable with the polyester; and
  (b) forming in an aqueous solution, as a water-in-oil-water emulsion, a stable dispersion of the globules of the droplet-containing amine neutralized solution of the carboxylic acid functional unsaturated polyester and copolymerizable monomer; and
  (c) polymerizing the polyester and copolymerizable monomer by free radical addition polymerization thereby producing granules of opaque, cross-linked vesiculated beads;

wherein the polyamine contains at least 3 amine groups per molecule; and wherein the amine is present at a concentration such that there are at least about 2.0 amine groups per each carboxylic acid group.

6 Claims, No Drawings

VESICULATED BEADS

This application is a division of application Ser. No. 517,491, filed July 26, 1983, now U.S. Pat. No. 4,461,849.

BACKGROUND OF THE INVENTION

1. Field of the Invention

This invention relates to an improved process for manufacturing vesiculated beads. The beads of this invention have special utility as opacifying agents and show improved scattering efficiency and resistance to shrinkage upon drying.

2. Description of the Prior Art

The technique of preparing porous articles from carboxylated, unsaturated polyester resins by emulsifying water into the polyester resin in the presence of a base and then polymerizing the resin has been known in the prior art. For example, U.S. Pat. No. 3,255,137 teaches the preparation of porous polymeric materials by a process involving dispersing water in a polymerizable liquid, dispersing the resulting emulsion in water and subsequently polymerizing the liquid.

U.S. Pat. No. 3,822,224 teaches a process of preparing vesiculated polyester resin granules by dispersing a styrene solution of carboxylated unsaturated polyester resin in an aqueous continuous phase in the presence of a base. In that process, the vesicles form spontaneously within the granules. Pigment could be included within the granules by a double emulsion process which involves the dispersion of pigment in water, the dispersion of the pigment dispersion into the polyester solution to give an emulsion of pigment dispersion in polymer, and the dispersion of this emulsion into the base-containing aqueous phase. These vesiculated beads were useful, but the granules shrank upon drying which could cause cracking and other defects in films containing the vesiculated beads as opacifiers.

U.S. Pat. No. 3,879,314 taught that dimensionally stable beads could be prepared by selecting a polyester resin having an acid value of 10–45 and utilizing an amine having a specified pKa range at a concentration such that there were 0.3 to 1.4 amine groups present per polyester resin carboxyl group.

Suprisingly, it has now been found that dimensionally stable vesiculated beads can be prepared by using amine concentrations outside of the range taught in U.S. Pat. No. 3,879,314 and that these novel beads have improved scattering efficiency and therefore act as more efficient opacifiers then the beads of the prior art.

SUMMARY OF THE INVENTION

This invention relates to a process for preparing an aqueous slurry of vesiculated, cross-linked polyester beads having improved scattering efficiency and resistance to shrinkage upon drying which process comprises:

(a) forming in the presence of a polyamine, as a water-in-oil emulsion, a stable dispersion of droplets of water in a solution of a carboxylic acid functional unsaturated polyester resin having an acid value of 8 to 20, and at least one ethylenically unsaturated monomer copolymerizable with the polyester; and (b) forming in an aqueous solution, as a water-in-oil-in-water emulsion, a stable dispersion of the globules of the droplet-containing amine neutralized solution of the carboxylic acid functional unsaturated polyester and copolymerizable monomer; and (c) polymerizing the polyester and copolymerizable monomer by free radical addition polymerization thereby producing granules of opaque, cross-linked vesiculated beads;

wherein the polyamine contains at least 3 amine groups per molecule; and wherein the amine is present at a concentration such that there are at least about 2.0 amine groups per each carboxylic acid group.

This invention also relates to an aqueous coating composition which comprises a water dispersible synthetic polymer and an opacifying amount of the vesiculated beads prepared by the process of this invention.

As used herein, the term "vesiculated beads" means those synthetic, opaque insoluble polymeric beads containing a plurality of microvoids, and optionally a pigment such as titanium dioxide dispersed within the beads. The vesiculated beads of this invention provide excellent dimensionally stability (that is, less than 5% shrinkage upon drying) and improved scattering efficiency when compared to the beads of the prior art.

It is therefore an object of this invention to provide an improved process for preparing vesiculated beads. Another object of this invention is to provide a process for preparing an aqueous slurry of vesiculated, cross-linked polyester beads having improved scattering efficiency and resistance to shrinkage. It is a further object of this invention to provide coatings having incorporated therein the improved vesiculated beads of this invention.

These and other objects of the invention will be apparent from the following description.

DETAILED DESCRIPTION OF THE INVENTION

In addition to the process for preparing vesiculated beads, this invention relates to an aqueous coating composition which comprises:

(a) a water dispersible synthetic polymer; and (b) an opacifying amount of vesiculated beads wherein the vesiculated beads have improved scattering efficiency and resistance to shrinkage upon drying and wherein the vesiculated beads are prepared by a process which comprises:

(i) forming in the presence of a polyamine, as a water-in-oil emulsion, a stable dispersion of droplets of water in a solution of a carboxylic acid functional unsaturated polyester resin having an acid value of 8 to 20, and at least one ethylenically unsaturated monomer copolymerizable with the polyester; and (ii) forming in an aqueous solution, as a water-in-oil-in-water emulsion, a stable dispersion of the globules of the droplet-containing amine neutralized solution of the carboxylic acid functional unsaturated polyester and copolymerizable monomer; and (iii) polymerizing the polyester and copolymerizable monomer by free radical addition polymerization thereby producing granules of opaque, cross-linked vesiculated beads; wherein the polyamine contains at least 3 amine groups per molecule; and wherein the amine is present at a concentration such that there are at least about 2.0 amine groups per each carboxylic acid group.

Illustrative synthetic polymers useful in the practice of this invention to prepare aqueous coatings include lattices which are dispersions, emulsions, suspensions or the like of the following representative polymers: acrylics; vinyl acetate homopolymers or copolymers such as copolymers with acrylates or ethylene; homopolymers and copolymers of styrene including: styrene-butadiene, carboxylated styrene-butadiene, polystyrene and copolymers of styrene and unsaturated acid anhydrides such as maleic anhydrides; polyvinyl alcohol; synthetic rubbers such as butyl rubber, chlorinated or hydrochlorinated rubber latex, and isoprene rubber latex; gums; homopolymers and copolymers of acrylonitrile with a diene like isoprene, butadiene, or chloroprene; homopolymers and copolymers of vinyl halides such as vinyl chloride, and vinylidene chloride, with each other or with acrylonitrile or vinyl esters such as vinyl acetate; homopolymers and copolymers of acrylic and methacrylic acid and their esters and derivatives with or without other monomers having —C=C— groups; polybutadiene, polyisoprene; olefinic resins such as polyethylene, polypropylene, etc.; carboxylated synthetic latices and similar polymeric materials. These latices may also be modified with alkyd materials as is well known in the art.

The process for making the beads taught in this invention involves essentially a three-step process. The first step involves forming in the presence of a polyamine, as a water-in-oil emulsion, a stable dispersion of droplets of water in a solution of a carboxylic acid functional unsaturated polyester resin having an acid value of 8 to 20, and at least one ethylenically unsaturated monomer copolymerizable with the polyester.

In the practice of this invention, the water-soluble polyamine must contain at least 3 amine groups, which may be primary, secondary or tertiary amine groups and must have a dissociation constant in water (pKa value) within the range of 8.5–10.5. If more than one type of amine group is present in the molecule then the relevant pKa value is that of the most basic amine group.

Suitable polyamine compounds are, for example, diethylene triamine, triethylene tetramine and oligomers of vinyl pyridine or dimethylaminoethylmethacrylate with polyethylene glycol methacrylate or mixtures thereof.

In order to obtain beads having improved scattering efficiency and sufficient dimensional stability, the amine must be present during the formation of the water-in-oil emulsion at a concentration such that there are at least about 2.0 amine groups per each carboxylic acid group. Preferably there will be between 2.0 and about 10 amine groups per polyester resin carboxyl group. In general, higher ratios of amine groups to acid groups provide beads with greater scattering efficiency.

Scattering efficiency, also called the $S_6$ value, has been described in an article by Bruehlman, R. T. and Ross, W. D., J. Paint Tech., 41, No. 538, P. 592 (1969). The higher the scattering efficiency, the greater the opacity of the bead. Scattering efficiencies above about 0.40 are especially preferred.

If desired, pigments such as titanium dioxide can be incorporated into the vesiculated beads of this invention by dispersing the pigment in water and then emulsifying the aqueous dispersion, of the pigment into the solution of the carboxylic acid functional unsaturated polyester resin and copolymerizable monomer. The incorporation of pigment in this manner also adds to the opacity, of the beads.

The carboxylic acid functional polyester resins of this invention can be formulated and manufactured by the reaction of polybasic acids or their corresponding anhydrides and polyols. Methods of making carboxylic acid functional polyester resins are well known in the art. The desired acid value of 8 to about 20, and preferably about 8 to about 14, can be obtained by utilizing a predetermined stoichiometric excess of acid or optionally by utilizing an excess of alcohol and terminating the reaction when the desired acid value has been reached. The preferred carboxylic acid functional polyester resins are prepared by the reaction of polybasic acids or their corresponding anhydrides and a dihydric alcohol. Polymerizable unsaturation is introduced into the polyester by the selection of an unsaturated acid or anhydride optionally in combination with a saturated acid or anhydride.

Suitable acids for producing the beads are, for example: unsaturated aliphatic acids such as maleic, fumaric, itaconic, citraconic and mesaconic; saturated aliphatic acids such as malonic, succinic, glutaric, adipic, pimelic, azelaic, tetrahydrophthalic, chlorendic and sebacic acids; and aromatic acids, such as phthalic, isophthalic, terephthalic, tetrachlorophthalic, trimellitic and trimesic.

Suitable dihydric alcohols are, for example, ethylene glycol, poly(ethylene glycols) e.g. diethylene glycol, 1,6-hexanediol, propylene glycol, dicyclohexanol and neopentyl glycol. Alternatively the alcohol may be one which initially contained three or more hydroxyl groups, the groups in excess of two optionally being, at least in part, etherified with, for example, a monohydric alcohol, e.g. methanol, ethanol and n-butanol or esterified with a monobasic acid, e.g. benzoic acid, or chain-like aliphatic acids of up to 18 carbon atoms chain length, e.g. coconut oil monoglyceride.

The polyesters will have an acid value of 8 to about 20 and a number average molecular weight between 1,000 and 100,000. An especially preferred polyester in the practice of this invention is the condensation reaction product of propylene glycol, fumaric acid and phthalic anhydride.

The ethylenically unsaturated copolymerizable monomer in which the unsaturated polyester resin is dissolved and crosslinked must be essentially water-insoluble. Monomers which have a solubility at 20° C. of less than 5% (w/w) in water are considered to be suitably water-insoluble for this purpose. A single monomer or a mixture of monomers may be used and in general the monomer will contain only a single polymerizable double bond. However, it is known that poly-functional monomers, that is monomers containing more than one polymerizable double bond, may also be used to crosslink unsaturated polyester resins. Such poly-functional monomers are, however, normally present only as a minor constituent of a mixture of monomers, the major proportion of which is mono-functional monomer. Hence mixtures comprising, e.g. divinyl benzene, may be used in the manufacture of the vesiculated beads.

The preferred ethylenically unsaturated monomers for the manufacture of the beads are styrene, vinyl toluene and methyl methacrylate, because of the ease with which they can be copolymerized with the unsaturated polyester resin. For the best results, the monomer should comprise at least 50% by weight of styrene, and it is usually preferred to use styrene as the only monomer.

Bearing in mind the requirements that the total monomer mixture must be essentially insoluble in water and also be a solvent for the unsaturated polyester resin, there may be present, in a minor proportion, other polymerizable unsaturated monomers which can modify the physical properties of the beads comprising the co-reacted resins. Typical co-monomers are, for example, ethyl acrylate, n-butyl methacrylate, acrylonitrile, and triallyl cyanurate. In general, the upper limit of usefulness of such monomers is about 10% by weight based on the total monomer used. Higher concentrations generally give granules which are either too brittle or too rubbery to be used effectively in paints.

Optionally, a few percent by weight of a non-polymerizing organic liquid, e.g. n-butanol or toluene, may be mixed with the monomer to increase the solubility of the polyester resin therein or may be introduced as an incidental part of the process, e.g. in preparing the polyester.

The second step in the formation of the beads of this invention involves forming in an aqueous solution, as a water-in-oil-in-water emulsion a stable dispersion of the globules of the droplet-containing amine neutralized solution of the carboxylic acid functional unsaturated polyester and copolymerizable monomer. This aqueous solution will typically contain stabilizer polymers such as polyvinyl alcohol or hydroxy ethyl cellulose to maintain the water-in-oil-in-water double emulsion at the required bead size.

The third basic step in the preparation of the beads of this invention involves polymerizing the polyester and copolymerizable monomer by free radical addition polymerization thereby producing the granules of opaque cross-linked vesiculated beads.

Polymerization within the globules is brought about by a free radical initiator, e.g. inorganic peroxide or by exposure to a radiation source such as ultraviolet radiation. When an organic source of free radicals is used this is conveniently introduced into the reactants by dissolving it in the monomer or polyester solution before the globule suspension is prepared. The free radical source is then activated by e.g. heating to its decomposition temperature. Alternatively, a redox process using e.g. diethylaniline as an activator may be used.

By the process of this invention vesiculated beads of from about 0.1 to about 500 micron diameter may be prepared and with vesicle diameters ranging from about 0.01 to 5.0 micron. Each granule will, on the average, contain more than one vesicle and when the granules are intended for use as opacifying agents the vesicles, which may occupy from 65 to 80 percent by volume of the granule, should have diameters within the range of 0.015 to 5.0 micron, preferably 0.03 to about 1.0 micron.

The vesiculated beads can be easily incorporated as an aqueous slurry into water based paints. The beads contain water and, optionally, pigment encapsulated in the vesicles of the crosslinked polymer particle. Upon drying, the vesicles empty and develop their microvoid hiding power.

The vesiculated beads prepared according to this invention may be used for a variety of purposes, for example, as low-density fillers and opacifiers in plastic, moldings, polymer films, paper and coatings. The beads of this invention are especially useful in aqueous coating compositions which comprise a water dispersible synthetic polymer and an opacifying amount of the vesiculated beads of this invention. An "opacifying amount" requires only that there be sufficient beads utilized in the formulation to provide the desired amount of opacity. Typically, the beads will be present in an amount ranging from about 0.1 to about 10 parts by weight beads for each part by weight solids of the synthetic polymer. Typically, the coating composition will also include conventional additives such as surfactants, solvents, thickeners, dispersants, wetting agents, defoamers, flow agents and other materials well known in the art. Normally, the coating compositions will also contain additional pigmentation including titanium dioxide, clays, zinc oxide, carbon black, mica, silicas, calcium carbonate, phthalocyanine blue and green pigments, chrome yellow pigments and the like.

The beads of this invention are especially suited to be used in combination with synthetic latex polymers. The aqueous slurry of beads may be added directly to the remaining constituents of the paint. The vesiculated granules persist as discreet particles in a dried film prepared from the paint composition. Because at least part of the liquid trapped in the vesicles diffuses out of them as the paint film dries, and thus provides air-filled vesicles, the granules can function in the dry film as both matting and opacifying agents.

The following examples are intended to illustrate the invention but are not presented as limitations upon the scope of the claims. Unless otherwise indicated, the term "parts" means parts by weight. The analysis of the shrinkage of the beads was conducted by diluting two drops of the bead slurries with 10 ml of deionized water. A drop of the diluted slurry was placed on a microscope slide, inserted into a microscope and a 320 magnification was photographed. The slurry was allowed to air dry until completely dry (about 40 minutes) and another photo of the identical field was taken. Ten large particles in each of the two photos were measured under a stereo microscope with a calibrated eyepiece and compared.

EXAMPLE I

An aqueous phase consisting of 10 parts ice, 11.08 parts water, 2.20 parts of a 75% solution of sodium sulfated dioctyl succinate in butanol, 0.32 parts ethanol, and 0.79 parts defoamer were mixed using a high speed disperser and a Cowles blade to obtain a homogeneous solution. Over a three minute period was added 53.2 parts titanium dioxide which was dispersed at a high impeller speed for about 15 minutes. The speed of the agitator was reduced and 1.04 parts diethylene triamine in 6.66 parts water was added and the aqueous dispersion was mixed for about 2 minutes.

In a separate mixing vessel 49.0 parts unsaturated polyester (reaction product of propylene glycol, fumaric acid and isophthalic anhydride in a mole ratio of 4.72/3.11/1, having an acid value of 12.4, as a 58% solution in styrene), and 18.52 parts styrene were mixed under low speed agitation. With the agitator maintained at low speed the aqueous dispersion was added to the polyester/styrene mixture over about a 2 minute period. This mixture has a ratio of amine groups/carboxyl groups of approximately 4.8/1. The agitator speed was increased for about 3 minutes, then reduced and maintained for about 15 minutes, thereby preparing a water-in-oil emulsion.

In a separate mixing vessel 43.23 parts of a 1.5% solution of hydroxyethyl cellulose in water, 47.97 parts of a 7.5% solution of polyvinyl alcohol in water, and 110.27 parts water were mixed at low speed. With the agitator maintained at low speed the water-in-oil emulsion from the previous step was transferred to the mixing vessel over a 4 minute period. The agitation was then increased and held for 20 minutes.

After the 20 minute period the agitator speed was reduced and 102.57 parts hot (52° C.) water was added followed by 0.921 parts cumene hydroperoxide. After mixing several minutes 0.159 parts of a 10% solution of diethylenetriamine in water was added followed by 1.05 parts of a 1% ferrous sulfate solution. Stirring was continued for 2 minutes and then stopped. The reaction temperature climbed from about 34° C. to about 52° C. in about 90 minutes. The reaction mixture was allowed to stand overnight. The product was a 26.6% solid aqueous suspension of pigmented vesiculated beads at 9.36 pounds per gallon which gave an excellent measured scattering efficiency ($m^2/g$. $TiO_2$) of about 0.51. Microscopic analysis of these beads indicated a shrinkage upon drying of only about 3.1%.

EXAMPLE II

The procedure described in Example I was repeated using the same polyester resin, but decreasing the amount of the diethylene triamine in the initial aqueous phase to 0.692 parts rather than the original 1.04 parts. This corresponds to an amine groups/acid groups ratio of about 3.2/1. The bead slurry prepared in this example had an excellent scattering efficiency of about 0.42 and also has an average shrinkage less than about 5.0%.

COMPARATIVE EXAMPLE A

The procedure of Example I was repeated except the polyester resin was the reaction product of propylene glycol, fumaric acid and isophthalic anhydride (in a molar ratio of 4.58/2.67/1) as a 65.5% solution in styrene having an acid value of 22.5 and with an amine/acid group ratio of only 1.75/1. This bead slurry had a scattering efficiency of only about 0.39 thereby showing the increased scattering efficiencies possible by utilizing the low acid value, high amine neutralization bead slurries of Examples I and II.

While this invention has been described by a number of specific embodiments, it is obvious that other variations and modifications may be made without departing from the spirit and scope of the invention as set forth in the appended claims.

The invention claimed is:

1. An aqueous coating composition which comprises:
   (a) a water dispersible synthetic polymer; and
   (b) an opacifying amount of vesiculated beads
   wherein the vesiculated beads are prepared by a process which comprises:
   (i) forming in the presence of a polyamine, as a water-in-oil emulsion, a stable dispersion of droplets of water in a solution of a carboxylic acid functional unsaturated polyester resin having an acid value of 8 to 20, and at least one ethylenically unsaturated monomer copolymerizable with the polyester; and
   (ii) forming in an aqueous solution, as a water-in-oil-in-water emulsion, a stable dispersion of the globules of the droplet-containing amine neutralized solution of the carboxylic acid functional unsaturated polyester and copolymerizable monomer; and
   (iii) polymerizing the polyester and copolymerizable monomer by free radical addition polymerization thereby producing granules of opaque, cross-linked vesiculated beads;
   wherein the polyamine contains at least 3 amine groups per molecule; and wherein the amine is present at a concentration such that there are at least about 2.0 amine groups per each carboxylic acid group.

2. The aqueous coating composition of claim 1 further characterized in that the vesiculated beads contain a pigment dispersed therein.

3. The aqueous coating composition of claim 2 further characterized in that the pigment is titanium dioxide.

4. The aqueous coating composition of claim 1 further characterized in that the polyamine is present at a concentration such that there are between 2.0 and about 10 amine groups per polyester resin carboxyl group during the formation of the water-in-oil emulsion.

5. The aqueous coating composition of claim 1 further characterized in that the carboxylic acid functional unsaturated polyester resin utilized in the manufacture of the vesiculated bead comprises the condensation reaction product of an unsaturated acid or anhydride and a diol.

6. The aqueous coating composition of claim 1 further characterized in that the carboxylic acid functional unsaturated polyester resin consists essentially of the condensation reaction product of propylene glycol, fumaric acid and phthalic anhydride.

* * * * *